United States Patent Office 3,781,233
Patented Dec. 25, 1973

3,781,233
BLOWING AGENTS
Erwin Muller, Leverkusen, Wolf-Dieter Wirth, Odenthal, Johannes Blahak, Cologne, and Harry Rohr, Leverkusen, Germany, assignors to Bayer Aktiengesellschaft, Leverkusen, Germany
No Drawing. Filed May 25, 1972, Ser. No. 256,730
Claims priority, application Germany, May 26, 1971, P 21 26 145.0
Int. Cl. C08j 1/20
U.S. Cl. 260—2.5 R    13 Claims

ABSTRACT OF THE DISCLOSURE

The invention relates to the use of bisbenzazimide compounds as blowing agents for the production of cellular and porous articles from acrylonitrile, butadiene and styrene copolymers. The blowing agents do not liberate any corrosive, discoloring, malodorous or toxic decomposition products.

This invention relates to the use of compounds of the bisbenzazimide series as blowing agents for the production of cellular and porous articles based on acrylonitrile, butadiene and styrene copolymers.

It is known that foam plastics can be produced from thermoplastic synthetic resins by incorporating an organic blowing agent with the synthetic resin or by adding to a granulate synthetic resin a blowing agent which decomposes with the evolution of gas, at temperatures at which the synthetic resin becomes plastic. Substances belonging to various classes of compounds have been described in the literature for this purpose, e.g. diazoaminobenzenes, azo-bisisobutyronitrile, dinitrosopentamethylene tetramine, N,N'-dinitroso-N,N'-dimethyl-tetraphthalimide, azodicarbonamide and benzene sulphonic acid hydrazides (see Angewandte Chemie 64 (1952), pp. 65–76). Substances belonging to these classes of compounds have, however, certain disadvantages which restrict their use as blowing agents. For example, the blowing agents may liberate decomposition products which are acid or alkaline in reaction or are toxic; furthermore, decomposition products which have a discoloring effect may be formed, which is a disadvantage, for example, in the production of foam plastics from polyvinyl chlorides. In the case of azodicarbonamides, which are frequently used in practice as blowing agents, ammonia is produced as one of the decomposition gases and causes corrosion in the metal moulds used for the production of the foams.

Another important factor is the decomposition temperature at which the blowing gas required for the foaming process is liberated. This decomposition temperature may be below or above the decomposition temperature determined in the pure blowing agent, depending on the synthetic resin used or on the other substances added to the synthetic resin.

It was an object of the invention to find blowing agents which would not liberate any corrosive, discoloring, malodorous or toxic decomposition products.

This invention thus relates to the use of compounds of the following General Formula I

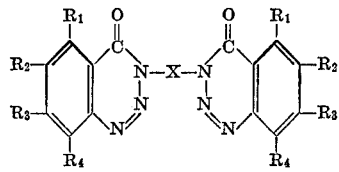

(I)

wherein $R_1$–$R_4$ may be the same or different and denote hydrogen, straight or branched chain alkyl radicals having 1 to 4 carbon atoms, hydroxyl or nitro groups or halogen atoms and X denotes a bond or a radical such as phenylene, naphthylene, diphenylene substituted with nitro or alkyl groups, enediamine and N,N' - dimethyl - N,N' - dimethyleneylene, methylene dicyclohexylene, cyclohexylene, ethylene, dimethylene carbonate, N,N'-dimethylene-ethylenediamine and N,N'-dimethyl - N,N'-dimethyleneethylenediamine or a radical obtained by removal of two hydrogen atoms from a diphenylether or from urea as blowing agents for the production of cellular or porous synthetic resin articles based on acrylonitrile, butadiene and styrene copolymers.

The compounds according to the invention are suitable for the production of foam plastics from thermoplastic synthetic resins. The following are examples of compounds according to the invention:

5,5'-dinitro-bisbenzazimide;
5,5'-dichloro-bisbenzazimide;
4,4'-dichloro-bisbenzazimide;
5,5'-dimethyl-bisbenzazimide;
4,4'-dimethyl-bisbenzazimide;
5,5'-isopropyl-bisbenzazimide;
4,4'-isopropyl-bisbenzazimide;
5,5'-tert.-butyl-bisbenzazimide;
4,4'-n-butyl-bisbenzazimide;
5,5'-dibromo-bisbenzazimide;
4,4'-dibromo-bisbenzazimide;
3,3',5,5'-tetrabromo-bisbenzazimide;
3,3',5,5'-tetrachloro-bisbenzazimide;
5,5'-dihydroxy-bisbenzazimide;
4,4'-dihydroxy-bisbenzazimide;
bisbenzazimide.

The blowing agents according to the invention may also be bisbenzazimides which are obtained by joining the two benzazimide rings through alkylene, cycloalkylene or arylene groups on the nitrogen atom in the 3-position, which alkylene, cycloalkylene and/or arylene groups may be interrupted by aryl groups and hetero atoms, preferably oxygen or sulphur. The following compounds are suitable for use according to the invention:

ethylene-5,5'-dichloro-bisbenzazimide;
ethylene-3,3',5,5'-tetrachloro-bisbenzazimide;
ethylene-5,5'-dinitro-bisbenzazimide;
ethylene-5,5'-dihydroxy-bisbenzazimide;
ethylene-5,5'-dimethyl-bisbenzazimide;
ethylene-5,5'-diisopropyl-bisbenzazimide;
ethylene-bisbenzazimide;
hexylene-5,5'-dibromobisbenzazimide;
hexylene-5,5'-dinitro-bisbenzazimide;
hexylene-4,4'-dinitro-bisbenzazimide;
hexylene-3,3',5,5'-tetrabromo-bisbenzazimide;
hexylene-5,5'-dimethyl-bisbenzazimide;
hexylene-5,5'-isopropyl-bisbenzazimide;
hexylene-bisbenzazimide;
o,m,p-phenylene-5,5'-dichloro-bisbenzazimide;
o,m,p-phenylene-4,4'-dibromo-bisbenzazimide;
o,m,p-phenylene-3,3',5,5'-tetrachloro-bisbenzazimide;
o,m,p-phenylene-5,5'-dinitro-bisbenzazimide;
o,m,p-phenylene-4,4'-dimethyl-bisbenzazimide;
o,m,p-phenylene-5,5'-isopropyl-bisbenzazimide;
o,m,p-phenylene-4,4'-di-n-butyl-bisbenzazimide;
o,m,p-phenylene-bisbenzazimide;
naphthylene-5,5'-dimethyl-bisbenzazimide;
naphthylene-bisbenzazimide;
naphthylene-4,4'-dichloro-bisbenzazimide;
2-nitrodiphenylene-bisbenzazimide;
2-ethyldiphenylene-5,5'-dimethyl-bisbenzazimide;
diphenylene-bisbenzazimide;

[5,5'-dichloro-bisbenzazimido]-diphenylether;
[3,3',5,5'-tetrachloro-bisbenzazimido]-diphenylether;
[5,5'-dinitro-bisbenzazimido]-diphenylether;
[5,5'-dimethyl-bisbenzazimido]-diphenylether;
bisbenzazimido-diphenylether;
bisbenzazimido-diphenylsulphone;
4,4'-bisbenzazimido-diphenylmethane;
4,4'-bisbenzazimido-dicyclohexylmethane;
p,p'-bis-[5,5'-dimethyl-bisbenzazimido]-dicyclohexylmethane;
N,N'-bisbenzazimido-urea;
bisbenzazimido-dimethylenecarbonate;
bisbenzazimido-dimethyleneethylenediamine;
bisbenzazimido-dimethylene-N,N'-dimethyl-ethylenediamine.

The compounds are added optionally in amounts of 0.01–30% by weight, preferably 1–10% by weight, based on the synthetic resin. The bisbenzazimides according to the invention may also be used in combination with known blowing agents.

The following mixtures of various thermoplastic polymers and so-called thermoplastic polyphasic synthetic resins are mentioned as examples of thermoplastic synthetic resins: Acrylonitrile-styrene-butadiene polymers; mixtures of polysulphone and styrene-acrylonitrile or acrylonitrile - butadiene - styrene polymers; mixtures of polycarbonate and acrylonitrile-butadiene-styrene polymers; mixtures of polyvinyl chloride and acrylonitrile-butadiene-styrene polymers or of polyvinyl chloride and ethylene-vinyl acetate copolymers; mixtures of polystyrene and rubbery elastic copolymers or segmental polymers based on butadiene-, or styrene-acrylonitrile copolymers with butadiene-acrylonitrile polymers.

In a preferred embodiment of the invention, diphasic synthetic resins are used, in which the hard phase based on polystyrene or a copolymer of styrene and alkyl styrene or halostyrene is made impact resistant by modification with a rubbery elastic phase based on butadiene.

It is preferred to use diphasic synthetic resins in which the hard phase based on copolymers of styrene and/or alkyl styrene and/or methyl methacrylate with acrylonitrile is rendered impact resistant by modification with a rubbery elastic phase based on butadiene and/or acrylic acid esters in which the alcohol component has 1 to 6 carbon atoms in an aliphatic or cycloaliphatic chain. The rubbery elastic phase may also consist of other diene rubbers based on isoprene or cyclopentadiene, copolymers of butadiene and styrene, butadiene and acrylonitrile or ethylene and vinyl acetate or terpolymers of ethylene and propylene, for example, with dienes as the tercomponent.

It is especially preferred to use diphasic synthetic resins in which the hard phase based on styrene and/or alkyl styrene and acrylonitrile is made impact resistant by modification with a rubbery elastic phase based on butadiene, for example, with a composition composed of 5 to 60% by weight of butadiene polymer containing not more than 30% of copolymerised styrene, isoprene and acrylonitrile and 95 to 40% by weight of polymerised styrene and acrylonitrile in proportions by weight of 90:10 to 50:50, in which styrene may be completely or partly replaced by α-methylstyrene or methyl methacrylate.

The blowing agents to be used according to the invention may be incorporated with the foaming mixtures by the usual methods, for example, by using mixing rollers, internal mixers or mixing vessels equipped with stirrers. They may be added at the same time as the other components of the mixture.

The mixtures may also contain other known auxiliary agents, e.g., active or inactive fillers such as carbon black or chalk, antioxidants, antiozonants, stabilizers such as salts of lead, cadmium, calcium, zinc, tin or barium, waxes, dyes, pigments, zinc oxide, fatty acids such as stearic acid, mineral oils, plasticisers such as dioctylphthalate, butyl nonylphthalate, butyl benzylphthalate, dibutyl phthalate, dibutyl adipate or tricresylphosphate, lubricants or peroxides.

The compounds of the General Formula I used according to the invention may be prepared by the known method described in Journal f. prakt. Chemie 2, 118, pp. 141 and 146, in which isatoic acid anhydride is first reacted with hydrazine to produce N,N'-bis-2-aminobenzoyl-hydrazine and ring closure to produce the required bis-benzazimide is then effected by reaction with sodium nitrite. Compounds of the General Formula I may also be obtained by first reacting isatoic acid anhydride with diamines instead of hydrazine to form bis-2-aminobenzoyl compounds and then carrying out ring closure by reaction with sodium nitrite.

EXAMPLE 1

The following substances were applied to mixing rollers at a temperature of 150° C. and homogenized by rolling for 10 minutes:

96.5 parts of a commercial ABS graft polymer consisting of 20.5% of acrylonitrile, 12.5% of butadiene and 67.0% of styrene,
2.5 parts of bis-benzazimide,
0.5 part of calcium stearate and
0.5 part of ionol.

The rolled sheet is size reduced and worked up into shaped products in an injection moulding machine at 240 to 260° C. The amounts fed into the machine are so calculated that the shaped products produced have a gross density of 0.7 g./cm.² These products were found to have the following properties according to ASTM test standards D 790 and D 256:

Flexural strength: 426 kg./cm.²
Impact strength: 24 cm. kg./cm. (Charpy ¼").

EXAMPLE 2

The procedure is the same as described in Example 1 but using 3 parts of 5,5'-dinitro-bisbenzazimide and temperatures of 220–240° C. A material having the following mechanical properties is obtained:

Flexural strength: 412 kg./cm.²
Impact strength: 21 cm. kg./cm. (Charpy ¼").

EXAMPLE 3

The procedure is the same as described in Example 1 but using 3 parts of 5,5'-dichloro-bisbenzazimide. The material obtained has the following properties:

Flexural strength 418 kg./cm.²
Impact strength: 20 cm. kg./cm. (Charpy ¼").

EXAMPLE 4

The following substances were applied to mixing rollers at a temperature of 140° C. and homogenized by rolling for 10 minutes:

96.5 parts of a commercial styrene-acrylonitrile copolymer consisting of 75% of styrene and 25% of acrylonitrile,
2.0 parts of bis-benzazimide,
1.0 part of 4,4'-phenylene-bisbenzazimide and
0.5 part of calcium stearate.

The rolled sheet was size reduced after cooling and then made up into test rods in an injection moulding machine at 220 to 240° C. The rate of feed was calculated so that the moulded products had a gross density of 0.7 g./cm.³. They were found to have the following properties:

Flexural strength: 531 kg./cm.²
Impact strength: 9 cm. kg./cm. (Charpy ¼").

EXAMPLE 5

The procedure is the same as described in Example 4 but using 3.5 parts of 4,4'-bis-benzazimido-diphenyl-ether. The material has the following properties:

Flexural strength: 543 kg./cm.$^2$
Impact strength: 17 cm. kg./cm. (Charpy ¼").

EXAMPLE 6

The procedure is the same as described in Example 4 but using 3 parts of N,N'-bisbenzazimide-urea. The material obtained has the following properties:

Flexural strength: 525 kg./cm.$^2$
Impact strength: 10 cm. kg./cm. (Charpy ¼").

EXAMPLE 7

Granules of a commercial impact resistant polystyrene consisting of 94% of styrene and 6% of butadiene were fed into a paddle mixer (Lödige) and wetted with 0.5% (based on the amount of resin in the mixer) of butyl stearate by spraying the butyl stearate on the granulate. 1% (based on the amount of resin introduced) of finely powdered bisbenzazimide was then added and the components mixed for 5 minutes. The granulate resin with blowing agent adhering to its surface was processed into test samples having a gross density of 0.75 g./cm.$^3$ in an injection extruder at 185 to 225° C. The samples were found to have the following properties:

Flexural strength: 295 kg./cm.$^2$
Impact strength: 38 cm. kg./cm.

EXAMPLE 8

A mixture of 3000 parts by weight of a graft copolymer of 17.5% of butadiene, 59.5% of styrene and 23% of acrylonitrile, 90 parts by weight of butyl stearate and 60 parts by weight of bisbenzazimide was granulated in a double screw extruder at temperatures of between 120° C. and 145° C. The granulate resin was then made up to shaped products in an injection moulding machine at a specific injection pressure of 800 kg./cm.$^2$ and a mass temperature of 250° C. The pieces have a matte surface and characteristic foam structure with partly open and partly closed pores. The gross density is 0.73 g./cm.$^3$.

We claim:

1. A process for the production of a cellular or porous thermoplastic synthetic resin article including the step of rendering said resin article cellular or porous by use of a blowing agent, in which the blowing agent is a compound or compounds of the formula:

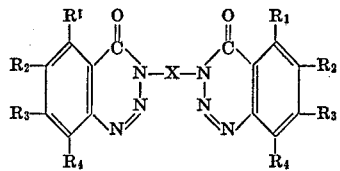

wherein
$R_1$–$R_4$ may be the same or different and denote hydrogen, straight or branched chain alkyl radicals having 1 to 4 carbon atoms, hydroxyl or nitro groups or halogen atoms and
X denotes a bond or a phenylene, naphthylene, diphenylene, diphenylene substituted with nitro or alkyl groups, diphenylene sulphone, methylene diphenylene, methylene dicyclohexylene, cyclohexylene, ethylene, dimethylene carbonate, N,N'-dimethylene-ethylenediamine or N,N'-dimethyl-N,N'-dimethylene-ethylenediamine radical or a radical obtained by removal of two hydrogen atoms from a diphenylether or from urea.

2. A process as claimed in claim 1 in which the blowing agent is present in a concentration of from 0.01 to 30% by weight, based on the thermoplastic synthetic resin.

3. A process as claimed in claim 2 in which the blowing agent is present in a concentration of from 1 to 10% by weight based on the thermoplastic synthetic resin.

4. A process as claimed in claim 1 in which the blowing agent is used in combination with another blowing agent.

5. A process as claimed in claim 1 in which the thermoplastic synthetic resin is a mixture of a thermoplastic polymer and a thermoplastic polyphasic synthetic resin.

6. A process as claimed in claim 1 in which the synthetic resin is an acrylonitrile-styrene-butadiene polymer, a mixture of a polysulphone and a styrene-acrylonitrile or acrylonitrile-butadiene-styrene polymer, a mixture of a polycarbonate and an acrylonitrile-butadiene-styrene polymer, a mixture of polyvinyl chloride and an acrylonitrile-butadiene-styrene polymer, a mixture of polyvinyl chloride and an ethylene-vinyl acetate copolymer, a mixture of polystyrene and a rubbery elastic copolymer, or a segmental polymer based on a butadiene, styrene or styrene-acrylonitrile copolymer with a butadiene-acrylonitrile polymer.

7. A process as claimed in claim 1 in which the thermoplastic synthetic resin is a diphasic thermoplastic synthetic resin in which the hard phase based on polystyrene or a copolymer of styrene and alkyl styrene or halostyrene is made impact resistant by modification with a rubbery elastic phase based on butadiene.

8. A process as claimed in claim 7 in which the hard phase is based on a copolymer of styrene and/or alkyl styrene and/or methyl methacrylate with acrylonitrile and is rendered impact resistant with a rubbery elastic phase based on butadiene and/or acrylic acid esters in which the alcohol component has 1 to 6 carbon atoms in an aliphatic or cycloaliphatic chain, a diene rubber based on isoprene or cyclopentadiene, a copolymer of butadiene and styrene, butadiene and acrylonitrile or ethylene and vinyl acetate or a terpolymer of ethylene, propylene and a diene.

9. A process as claimed in claim 8 in which the diphasic resin contains from 5 to 60% by weight of butadiene polymer containing not more than 30% of copolymerised styrene, isoprene and acrylonitrile and 95 to 40% by weight of polymerised styrene and acrylonitrile in proportions by weight of 90:10 to 50:50.

10. A process as claimed in claim 9 in which styrene is completely or partly replaced by α-methyl styrene or methyl methacrylate.

11. A process as claimed in claim 1 in which the foaming mixture contains an auxiliary agent or agents.

12. A process as claimed in claim 11 in which each auxiliary agent is selected from the group consisting of an active or inactive filler; carbon black; chalk; an antioxidant; an antiozonant; a stabilizer; salt of lead, cadmium, calcium, zinc, tin or barium; a wax; a dye; a pigment; zinc oxide; a fatty acid; stearic acid; a mineral oil; a plasticiser; dioctylphthalate; butyl nonylphthalate; butyl benzylphthalate; dibutyl phthalate; dibutyl adipate; tricresyl phosphate; a lubricant and a peroxide.

13. A thermoplastic synthetic resin article which contains a blowing agent amount of a compound of the formula:

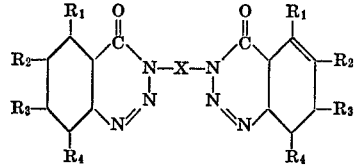

wherein $R_1$–$R_4$ may be the same or different and denote hydrogen, straight or branched chain alkyl radicals having 1 to 4 carbon atoms, hydroxyl or nitro groups or halogen atoms and X denotes a bond or a phenylene, naphthylene, diphenylene, diphenylene substituted with nitro or alkyl groups, diphenylene sulphone, methylene diphenylene, methylene dicyclohexylene, cyclohexylene, ethylene, dimethyl carbonate, N,N'-dimethylene-ethylenediamine or N,N'-dimethyl-N,N'-dimethylene-ethylenediamine radical or a radical obtained by removal of two hydrogen atoms from a diphenylether or from urea.

References Cited

UNITED STATES PATENTS

| | | | |
|---|---|---|---|
| 2,798,055 | 7/1957 | Sullvan | 260—2.5 R |
| 3,152,176 | 10/1964 | Hunter | 260—2.5 R |
| 2,828,299 | 3/1958 | Von Glahn et al. | 260—2.5 R |
| 2,766,227 | 10/1956 | Hardy et al. | 260—2.5 R |
| 2,912,391 | 11/1959 | Hardy et al. | 260—2.5 R |

OTHER REFERENCES

Journal f. prakt. Chemie 2, 118, pp. 140–147.

MORTON FOELAK, Primary Examiner

U.S. Cl. X.R.

260—2.5 HA, 2.5 HB, 30.6 R, 31.8 DR, 31.8 Z, 33.6 UA, 33.6 A, 33.6 AQ, 41 R, 41.5 R, 45.75 R, 45.75 K, 248 AS, 873, 876 R, 887, 893, 897, 898, 899